United States Patent [19]

Kamp

[11] 3,978,976
[45] Sept. 7, 1976

[54] CONVEYOR WITH METALLIC MESH BELT DISTORTION COMPENSATING MEANS

[75] Inventor: Ewald Albert Kamp, Chicago, Ill.

[73] Assignee: Union Carbide Corporation, New York, N.Y.

[22] Filed: Mar. 30, 1972

[21] Appl. No.: 239,628

[52] U.S. Cl. .............................. 198/617; 198/819
[51] Int. Cl.² ........................................ B65G 15/08
[58] Field of Search .......... 198/191, 192, 193, 194, 198/201, 116, DIG. 2; 74/241, 239

[56] References Cited
UNITED STATES PATENTS

| | | | |
|---|---|---|---|
| 826,312 | 7/1906 | Callin | 198/191 |
| 1,559,772 | 11/1925 | Peale | 198/191 |
| 1,922,908 | 8/1933 | Coleman | 198/201 |
| 2,561,708 | 7/1951 | Milik | 198/192 R |
| 2,568,174 | 9/1951 | Staacke | 198/192 R |
| 2,925,903 | 2/1960 | Robbins | 198/191 |
| 2,955,699 | 10/1960 | Lanier | 198/191 |
| 2,969,878 | 1/1961 | Finney, Jr. | 198/191 |
| 3,324,806 | 6/1967 | Olsen | 198/191 |
| 3,586,156 | 6/1971 | Easley, Jr. | 198/201 |

FOREIGN PATENTS OR APPLICATIONS

| | | | |
|---|---|---|---|
| 228,125 | 6/1963 | Austria | 198/194 |
| 827,979 | 11/1969 | Canada | 198/78 |

*Primary Examiner*—Benjamin W. Wyche
*Assistant Examiner*—Allan R. Burke
*Attorney, Agent, or Firm*—J. Hart Evans

[57] ABSTRACT

A moving belt which is tubularized and detubularized or otherwise shaped as by moving it through right angle turns is relieved of induced stresses and strains by passing the belt over a belt contouring device such as a set of coaxial pulleys of varying diameters with a preselected profile such that it distorts the belt in a manner which compensates for the distortion of the previous tubularization or the like.

8 Claims, 16 Drawing Figures

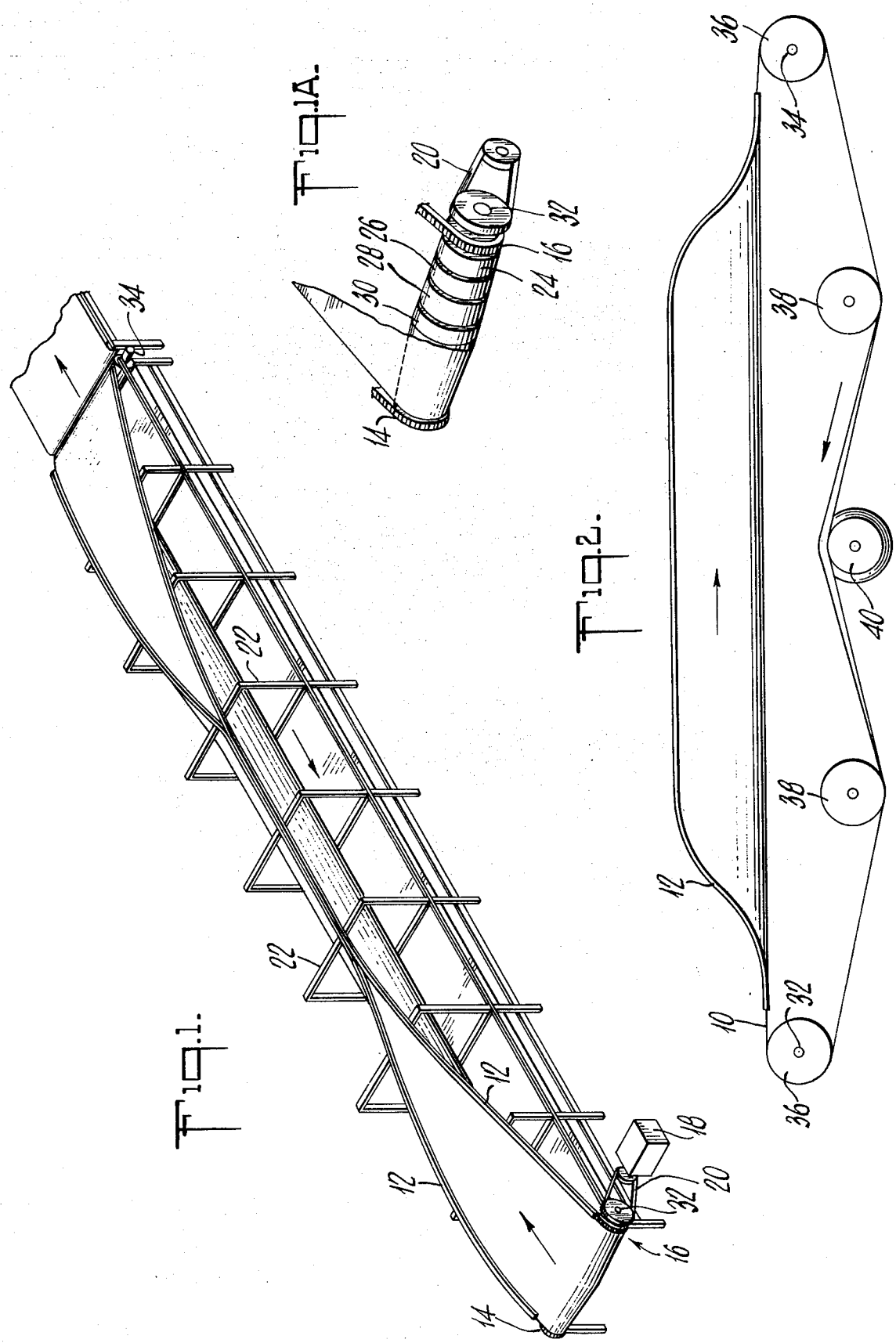

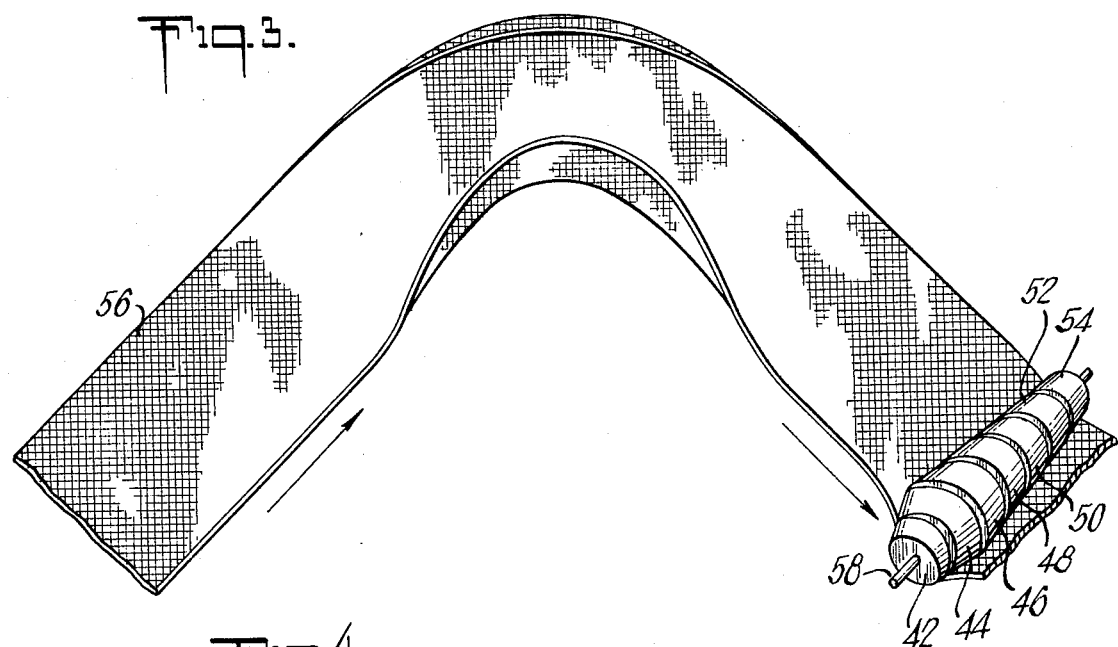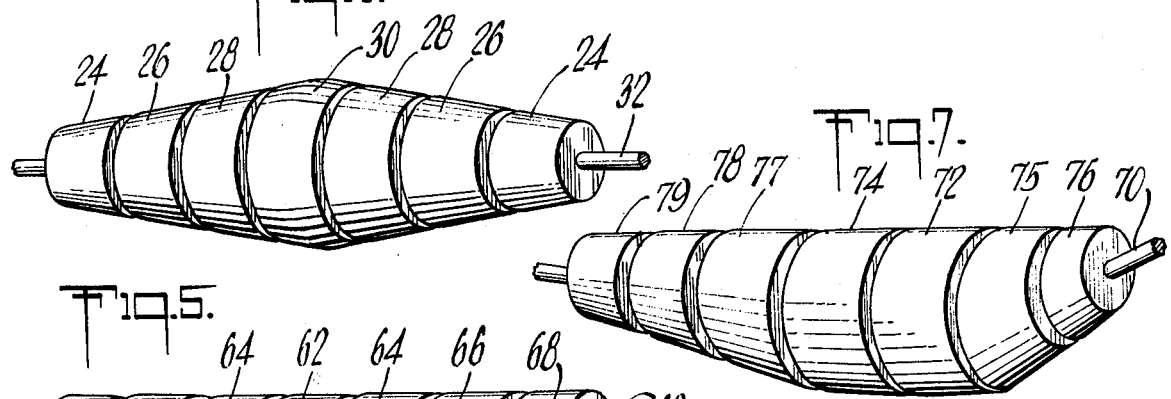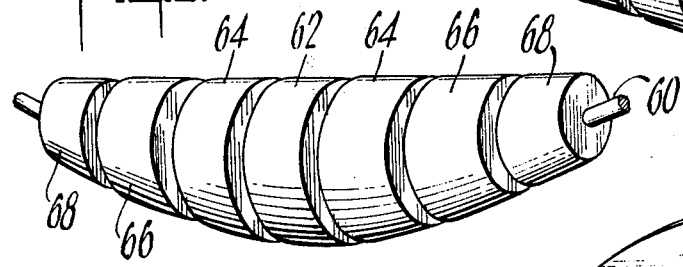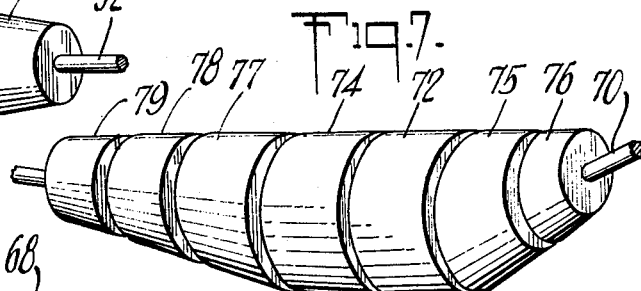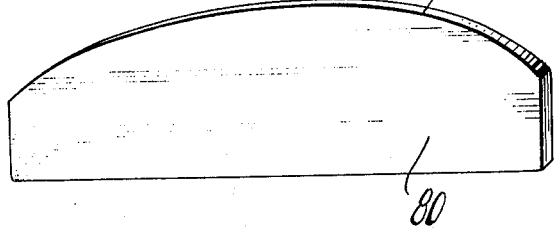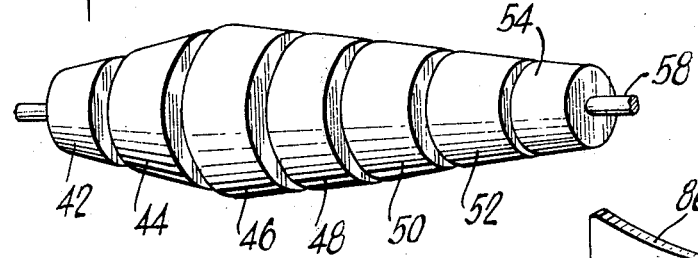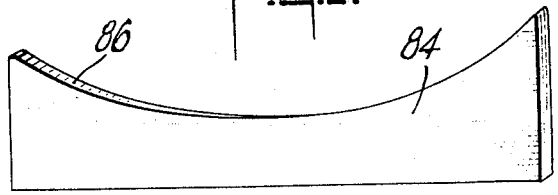

CONVEYOR WITH METALLIC MESH BELT DISTORTION COMPENSATING MEANS

Many industrial processes require a moving flexible belt which can be twisted and shaped into desired configurations and restored to its original shape without damage to the belt or alteration of its physical structure. This frequently is the case with the conveyor belts which must have a semi-tubular cross-sectional profile such as to contain the material being transported. These belts are often made of a more or less elastic material, one which is capable of limited distortion and flexing. Such elastic materials cannot be used for belts in all applications, however, because they store energy when flexed. For this reason, unless they are maintained under high tensile forces their shape or contour may change from what is desired. Thus many applications require belts made of woven mesh or the like. The most convenient manner of using woven mesh material in a belt would be to use a strip as it was loomed, that is, with the warp strands parallel to the direction of movement or travel of the belt and the weft strands at right angles to the direction of travel. Such use of wire mesh in the belt systems presently available, however, is limited to those systems where the belt is flat throughout its path of travel and return, with no changes in direction and bending up of the edges of the belt.

In commonly employed belt systems wherein the belt is partially tubularized or at least has the edges bent up to contain the material being transported, and may change direction several times, the attendant stresses on and distortions of the belt would quickly deform and soon destroy an ordinary woven mesh belt. One possible solution to this problem is to use what is known as a "bias-woven" belt, that is, a belt in which the warp and weft threads of the mesh are at an angle, usually about 45°, with the edge of the belt. In wider belts this can be done by cutting a segment of the mesh at a 45° angle across the warp threads and then splicing pieces together to make the belt. This necessity for multiple splicing adds greatly to the cost of the belt and provides areas of possible weakness and future rupture.

I have now discovered a way of constructing and operating moving belt systems which compensates for distortions introduced into the belt by changes in its configuration or direction of travel. This greatly reduces the stresses and strains in the belt material and prevents permanent deformation of the material. My invention permits the use of various belt materials, including woven mesh as it is loomed, without the necessity for cutting and splicing it to achieve a bias-woven belt. while my invention has particular utility in the field of conveyor belts and offers a particular advantage when it is desired to use a woven mesh belt, the invention is useful regardless of the material from which the belt is made and regardless of the purpose for which the latter is intended. Belt systems benefited by the invention include any in which the belt serves as a support for particulate materials, whether or not they are distributed uniformly across the belt width.

In the drawing:

FIGS. 1 and 1A illustrate a tubularizing and detubularizing belt system wherein distortion-compensation according to the invention is achieved with two contoured multi-wheel pulleys.

FIG. 2 is a side view of a tubularizing and detubularizing belt wherein distortion-compensation according to the invention is achieved with a single contoured multi-wheel pulley.

FIG. 3 illustrates a right angle turn in the plane of travel of a flat belt and a single barrel pulley compensating further distortion induced by the turn.

FIG. 4 illustrates a straight-axle multi-wheel symmetrical barrel pulley.

FIG. 5 illustrates a curved-axle multi-wheel symmetrical barrel pulley.

FIG. 6 illustrates a straight axle multi-wheel asymmetrical barrel pulley.

FIG. 7 illustrates a curved shaft multi-wheel asymmetrical barrel pulley.

FIG. 8 illustrates a solid belt contouring form.

FIG. 9 illustrates a solid belt contouring form.

Figure 10:
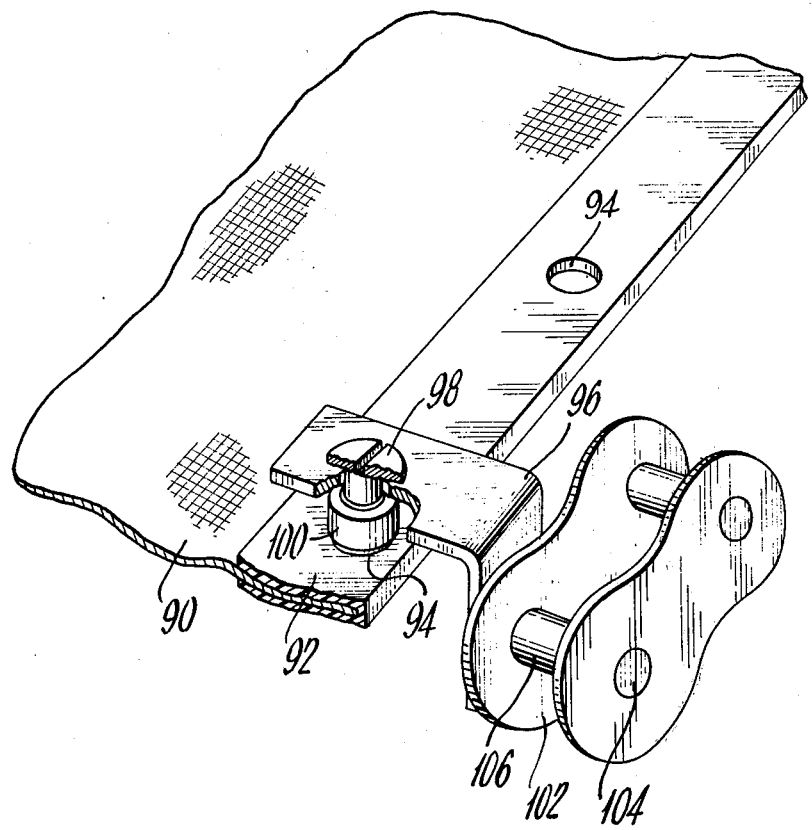
FIG. 10 is a detail view of a belt edge guide assembly.

In FIG. 1 a continuous belt 10 is guided by tracks 12 which engage chains 14 attached to the edges of the belt 10. Spur gears 16 engage the chains 14 and thus drive the belt 10, being powered by a motor 18 through a drive belt 20. The track 12 is supported by braces 22. As can be seen more clearly in the partial view of FIG. 1A, at each end of the machine the belt 10 passes over a plurality of pulleys 24, 26, 28 and 30 which are free to rotate on fixed straight axles 32 and 34. Center pulley 30 is the largest and the configuration of the roller formed by the pulleys tapers to the smaller diameter of the end pulleys 24. The shaped pulleys on axle 32 induce a slight distortion in belt as it passes over them because the center of the belt travels a greater distance than the edges.

As the belt 10 moves in the direction of the arrow and is guided by the tracks 12 into a tubular configuration the edges travel a relatively greater distance than the center of the belt and the distortion induced by the pulleys on axle 32 is relieved. Then as the belt 10 moves further and is detubularized the edges of the belt again travel further than the center and further distortion is introduced during the detubularization. The set of pulleys 24, 26, 28 and 30 on the axle 34 relieve this distortion as the belt 10 passes over them. Thus the belt 10 as it travels flat back to the axle 32 is in a substantially distortion free condition.

FIG. 2 schematically illustrates a variation of the apparatus shown in FIG. 1. In this embodiment there are flat rollers 36 on the axles 32 and 34 so that when the belt 10 passes over these flat rollers distortion of the belt is neither increased nor decreased. The distortion introduced into the belt by tubularization and detubularization is relieved by the set of contoured pulleys 40 over which the belt passes. In the set of pulleys 40 the center pulley is of the largest diameter and the profile contour of the set of pulleys slopes smoothly to the smaller end pulleys. In passing over this set of pulleys 40 the center of the belt travels a greater distance than the edges thereby reducing the distortion present. Idler rollers 38 position the belt 10 relative to the rest of pulleys 40 to achieve the desired distortion relief. The belt 10 in FIG. 2 is driven by gears engaging a chain attached to the belt edges in the manner shown in FIG. 1, these details having been omitted for clarity in FIG. 2.

FIG. 3 is a schematic representation of the use of a contoured set of pulleys 42, 44, 46, 48, 50, 52 and 54 in the manner of the invention to relieve distortion introduced in a belt 56 by a right turn in the direction of movement of the belt. For clarity only the belt 56 and the set of pulleys on axle 58 have been shown. The belt would be driven and guided in the manner of the belt 10 in FIG. 1. Because the distortions introduced in the belt 56 by the right angle turn are different from those introduced by tubularizing and detubularizing, the shape of the contoured set of pulleys is also different. Thus the largest diameter pulleys 44 and 46 are not centered along the axle 58 but are toward one end, to better compensate for the introduced distortion.

FIG. 4 is a detailed view of a straight axle set of pulleys of the type mounted on axles 32 and 34 in the apparatus shown in FIG. 1. Thus the largest diameter pulley 30 is in the center of the shaft and pulleys 28, 26 and 24 of descending diameters are positioned on either side of it. This results in a convex or barrel-shaped contour for the set of pulleys.

FIG. 5 is a detailed view of a curved axle set of pulleys. The largest diameter pulley 62 is mounted in the center of the curved axle 60 and pulleys 64, 66 and 68 of descending diameter are positioned on either side of the center pulley 62. Because the axle 60 is curved the contour of the set of pulleys is convex in the plane of the curved axle or shaft 60 on the convex side of the axle 60 and a straight line in this plane on the concave side.

FIG. 6 illustrates an asymmetrically contoured set of pulleys mounted on a straight axle 58, the pulleys being of the type shown in FIG. 3 with the largest diameter pulleys 44 and 46 flanked by progressively smaller diameter pulleys 42 on one side and 48, 50, 52 and 54 on the other. In FIG. 7 can be seen a similar set of pulleys mounted on a curved shaft 70 with the largest diameter pulleys 72 and 74 flanked pulleys of decreasing diameter 75 and 76 on one side and 77, 78 and 79 on the other. The contour of this set of pulleys in the plane of the curved axle 70 is that of an asymmetrical convex curve on the convex side of the axle 70 and a straight line on the concave side.

FIG. 8 illustrates a solid belt contouring guide 80 with a smooth contoured convex edge 82 over which the belt is passed. If desired the edge 82 may have a coating of a low friction material to reduce drag as the belt passes over it. FIG. 9 illustrates a solid belt contouring guide 84 with a smooth contoured concave edge 86 over which the belt is passed. As with the guide 80 the edge 86 of the guide 84 may have a low-friction coating.

In FIG. 10 can be seen a detail view of a method of attaching the edge of the belt to guide and drive means. In this embodiment the edge of the belt 90 is reinforced with a flexible reinforcing strip 92 which is glued, crimped, soldered or otherwise attached to the belt. Holes 94 are punched through the strip 92 and belt 90 at regular intervals along the edge of the belt. Angle brackets 96 are attached at end to the reinforced edge strip 92 by rivets 98 with spacing washers 100 between the bracket 96 and the strip 92. The other end of the bracket 96 is attached to the inner chain link side plate 102 by a rivet 104 extending through the chain link spacer 106. With the belt attached to the chain in this manner the belt can be both driven and guided by movement of the chain.

Figure 11:
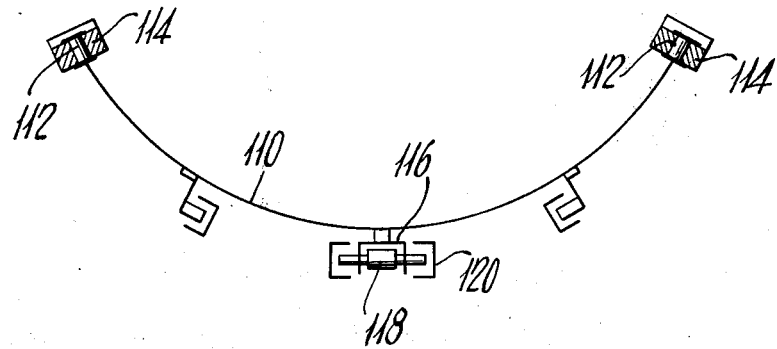
FIG. 11 is a cross-sectional view of a supported and guided belt.

In FIG. 11 is shown a schematic cross section of a belt driven and guided by a more complex arrangement of chains and guides. In this embodiment a belt is attached at its edges to chains 112 which run in tracks 114. At the center of the chain 110 it is attached through brackets 116 to a center chain 118 which runs in a track 120, thus providing means to apply a driving force at the center of the belt as well as at the sides. This is particularly helpful when the belt is used as a conveyor belt or the like. In addition to the edge and center chains 112 and 110, which drive as well as guide, there are guides 122 attached to the belt 110 between the edge chains 112 and center chains 118. These guides 122 run in tracks 124 and serve to guide and control the path of the belt 110.

Figure 12:
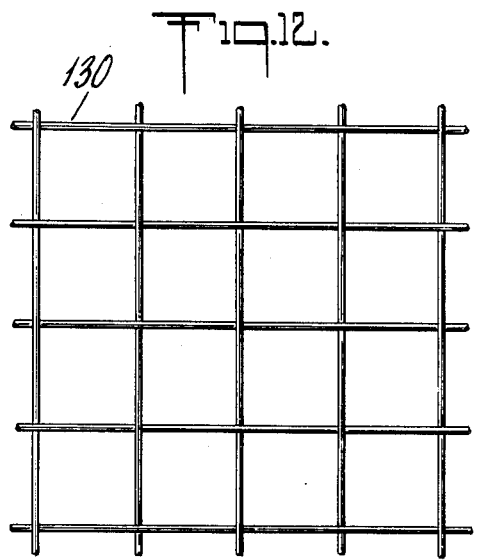
FIG. 12 illustrates a square weave mesh for a belt.
Figure 13:
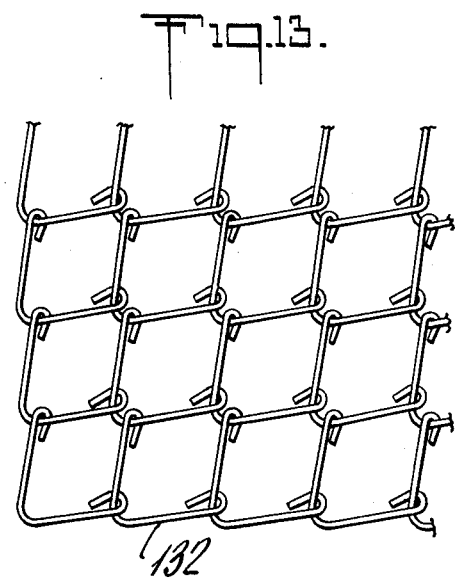
FIG. 13 illustrates a double articulating wire link mesh for a belt.

The invention can be applied to any flexible, relatively inelastic belt, regardless of the material of which it is made or the manner in which it is constructed. Thus the belt may be a woven mesh 130, as shown in FIG. 12, or a non-woven mat, with mesh strands of any suitable non-elastic material inluding metals such as copper, steel, aluminum or the like, as well as natural and synthetic fibers such as glass, polyester, graphite, nylon and the like. The mesh of double articulated link 132 shown in FIG. 13 can be a metallic wire such as copper, steel, aluminum or the like or any other suitable non-elastic material including molded or extruded plastic such as polyester, nylon, polypropylene or the like.

Figure 14:
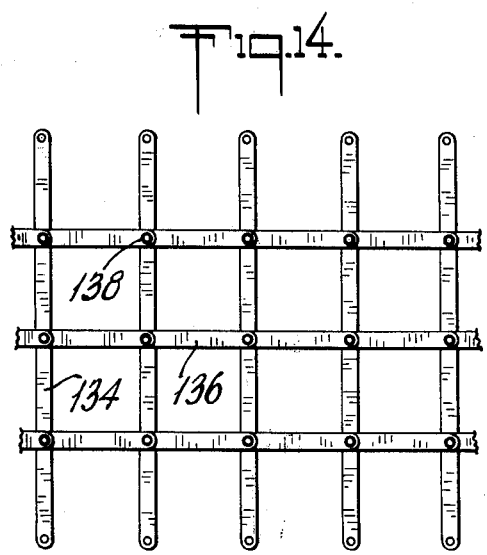
FIG. 14 illustrates a pinned link mesh for a belt.
Figure 15:
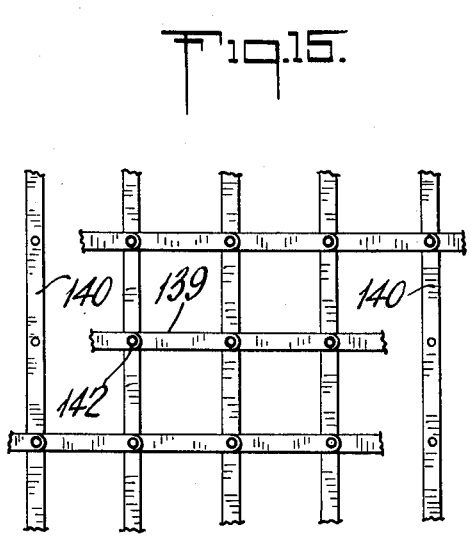
FIG. 15 illustrates a cross-linked continuous strand mesh for a belt.

Another suitable belt material is the pinned link mesh of FIG. 14 in which individual warp links 134 and weft links 136 are secured by rivets 138. These links can be metal such as copper, bronze, steel, aluminum or the like, as plastic such as polyethylene, polypropylene, polyester, nylon or the like, leather or any other suitable non-elastic material. These same materials are suitable for the cross-linked continuous strand mesh of FIG. 15 in which individual weft links 139 connect continuous warp strands 140 through rivets 142. The common characteristic of all these materials is their ability to articulate at cross-overpoints or intersects of strands.

The drive means utilized can be any convenient system of moving the belt. In the case of belts of moderate width and weight the driving force can be applied to the edges of the belt alone. With particularly wide and/or heavy belts additional moving force can be applied at other points across the width of the belt, usually at the center. Thus a belt can be readily driven and guided at the same time by fastening a chain to the edges of the belt as shown in FIG. 10 and driving the chain with sprocket gears as shown in FIG. 1 while running the chain through guide tracks as shown in FIG. 1. Additional driven chain, such as the center chain shown in FIG. 10, can also be employed. It is however within the scope of the invention to supply a driving force to the belt in other ways as by driving a flat pulley with a surface which would frictionally engage the belt. And of course guide means for the edge of the belt could not have to be a belt but could be any guide member capable of being guided by a track or the like.

The belt contouring means preferred for the invention is a set of pulleys as illustrated in various embodiments in the drawings. While a flat pulley contour used to control or drive the belt can be achieved with a single flat pulley, a shaped pulley contour so positioned as to change the profile of the belt from flat to a contoured shape requires a plurality of pulleys. This is because different points across the thus shaped profile of the belt travel relatively different path lengths requiring relatively different rotational speeds for the individual pulleys which make up the contoured shape. To accomodate these differences requires a plurality of pulleys which can rotate at slightly different speeds. Under some circumstances the belt contouring means may be a solid form with a smooth low friction surface over which the belt can slide readily.

While the invention has been described and illustrated with reference to tubularizing and detubularizing a belt and to moving a belt through a 90° turn, it can be utilized in any situation where the path of a moving belt is such that stresses and strains are introduced into the belt material. such stresses and strains occur when distortions of the belt tend to selectively retard warp direction elements of the belt by in effect causing such elements to travel relatively greater distances. To compensate for and relieve these stresses in the manner of the invention it is necessary to pass the belt over a contoured surface, preferably a set of freely rotating pulleys, which provide a contour profile which supports the previously retarded elements of the belt during a change of belt direction in a manner to restore the original alignment of warp direction elements of the belt across the width of the belt. This is accomplished because the contour of the pulley is such as to make the lenths of the paths of travel in the belt mechanism of all warp direction elements of the belt substantially equal. At the same time the contoured pulley insures substantially equal tension in all strands of the belt, thereby avoiding increased tension and attendant stress at the edges of the belt where the driving force is applied.

A machine was designed according to the invention to tubularize a belt in a 24 inch diameter inside circle. The belt width in an undistorted state is thus defined by $\tau \times$ diameter. The edges of the belt consisted of flexible roller chains capable of limited bending and twist in all directions. These roller chains were guided in rigid accurately aligned control tracks. The tubularizing-detubularizing or folding-unfolding mode was defined by two criteria:

1. The radius of curvature of the belt was kept constant at 12 inches.
2. As the center of the belt flattened, the flat portion widened exponentially in accordance with the general equation.

$$W = A'X^n + B$$

where
  $W$ = width of flat portion
  $X$ = detubularizing distance
Detailed mathematical analysis yielded the information that an optimal value of $n$ was 1.35. To allow for chain guide space at the point where the belt forms a full circle, a distance of 1⅛ inches from either side of the center line was subtracted from the circumference both in the analysis and the construction of the test machine. The mathematical analysis was performed and programmed on a computer to indicate the position of every belt point during travel as well as the angular distortion of belt strands during every point of the belt travel.

The belt material chosen was a woven phosphor bronze wire of 26 × 44 count, twill weave, 26.4% open. This belt was woven with a very low crimp in the cross direction and a high crimp in the machine, or travel, direction. It thus became relatively "sleazy," to allow strands to rotate at cross-over points. The belt was fastened with eyelets and bolts to roller chain lugs and paint striped across the width at regular intervals. The bronze weave was tested in tension in a machine direction in an "Instron" test machine. It was found the permanent elongation occurred at ½% elongation in a single cycle and at ¼% elongation after 10 cycles. The elongation is due to the stress concentrations at the sharp bends of the crimp and is progressive.

Symmetry was maintained along the axis of the belt from the center of the machine length. The tubularizing-detubularizing length was fixed at 12 times the inside diameter of the circle. The following properties were calculated:

a. Difference of long strand length at center and along the curved path of the chain was 1.427% at a 24 foot distance.

b. Displacement of cross strands at center line of machine was 3.875 inches.

c. Weave distortion angle at chain was 15.50 degrees.

Compensating pulleys were mounted at both ends of the machine. At the outside sprockets were used with a chain pitch diameter of 25.471 inches. Free wheeling idler pulleys were placed at intervals ranging from 28.08 inches at the center and progressing at intervals of 6 inches according to the following table:

| Distance from Center Line Inch | Pulley Diameter Inch | |
|---|---|---|
| 6 | 28.07 | one pulley used |
| 12 | 27.98 | at 28.03 Average |
| 18 | 27.71 | |
| 24 | 27.20 | |
| 30 | 26.44 | |
| 36 | 25.57 | |

The pulleys were contoured to a curve based on the above table.

Extensive measurements were performed during running of the test machine at speeds varying from 25 to 250 feet per minute. Painted cross stripes were used to measure weave distortion both at the top of the pulley and underneath. The free radius of curvature of the belt was measured during detubularizing and was found not to vary more than + ½ inch from the design value of 12 inches. The expanding flat portion of the belt precisely followed the preset gauge plates used for measuring. Displacement of cross-strands at the center of the belt varied from 3¾ to 4 inches. No change was observed over the entire speed range. No elongation of the belt took place in approximately 600 hours of running.

What is claimed is:
1. A moving belt mechanism comprising:
  a continuous belt which is substantially inelastic and is susceptible to only limited distortion and flexing,
  drive means engaging said belt along lines parallel and proximate with or coincident with the edges of said belt,
  belt edge guide means contacting said belt along lines parallel and proximate with or coincident with the edges of said belt to guide the edge areas of said belt along predetermined paths, and belt contouring means comprising at least one belt shaping device in a contoured shape of preselected design contacting the surface of said belt so as to change the cross-sectional profile of said moving belt in a pre-selected distortion-compensating sequence such that the distortions introduced into said belt by variations between the paths of the center of said belt and the edge areas of said belt are compensated for and thus removed, said contoured shape being a curve such that when said belt is passed across said device the surface of the belt is displaced from the place of the edges of said belt in a smooth curve, said belt shaping device comprising a plurality of adjacent pulleys freely rotating about a straight central axis, said pulleys varying in diameter to provide on their outer surfaces a smoothly curved surface.

2. A moving belt mechanism according to claim 1 wherein the middle pulley of said plurality of pulleys has the largest diameter and the other pulleys decrease in diameter from said middle pulley to said edge pulleys.

3. A moving belt mechanism comprising:
a continuous belt which is substantially inelastic and is susceptible to only limited distortion and flexing,
drive means engaging said belt along lines parallel and proximate with or coincident with the edges of said belt,
belt edge guide means contacting said belt along lines parallel and proximate with or coincident with the edges of said belt to guide the edge areas of said belt along predetermined paths, and
belt contouring means comprising at least one belt shaping device in a contoured shape of preselected design contacting the surface of said belt so as to change the cross-sectional profile of said moving belt in a pre-selected distortion-compensating sequence such that the distortions introduced into said belt by variations between the paths of the center of said belt and the edge areas of said belt are compensated for and thus removed, said contoured shape being a curve such that when said belt is passed across said device the surface of the belt is displaced from the place of the edges of said belt in a smooth curve, said belt shaping device comprising a plurality of adjacent pulleys freely rotating about a fixed curved shaft, the diameter of said pulleys varying in diameter to provide on their outer surfaces in the plane of curvature of said shaft, a smoothly curved surface on one side of said shaft and a straight line on the other.

4. A moving belt mechanism according to claim 3 wherein the middle pulley of said plurality of pulleys has the largest diameter and the other pulleys decrease in diameter from said middle pulley to said edge pulleys.

5. Method of compensating for and eliminating, at least once during each movement cycle of a moving belt of substantially inelastic material susceptible to only limited distortion and flexing, the distortion engendered in said moving belt during the cyclical alteration of its cross-sectional shape incident to a change in the direction of movement of said belt (to a desired configuration) by the attendant variations between the paths of the center of said belt and the paths of the edge areas of said belt, which method comprises providing additional cyclical variations between the path of the center of said belt and the paths of the edge areas of said belt, which variations restore said belt to an undistorted state at least once during each cycle of belt movement.

6. Method of compensating for and eliminating at least once during each movement cycle of a moving belt of substantially inelastic material susceptible to only limited distortion and flexing, the distortion engendered in said moving belt during the cyclical alteration of its cross-sectional shape to a desired configuration by the attendant variations between the paths of the center of said belt and the paths of the edge areas of said belt, which method comprises providing additional cyclical variations between the path of the center of said belt and the paths of the edge areas of said belt, which variations restore said belt to an undistorted state at least once during each cycle of belt movement, there being two of said equalizing variations for each alteration to a desired configuration, the first equalizing variation occurring prior to said alteration to a desired configuration and comprising a reverse distortion of said belt from its undistorted state, said reverse distortion equalizing a portion of the distortion introduced in said belt by said alteration to a desired configuration and thus decreasing the distortions remaining in said belt after it has been altered to said desired configuration and restored therefrom, said remaining distortions being removed by the second equalizing variation.

7. Method according to claim 6 wherein said belt is essentially distortion free while in said desired configuration.

8. A moving belt mechanism comprising:
a continuous belt which is substantially inelastic and is susceptible to only limited distortion and flexing,
drive means engaging said belt along lines parallel and proximate with or coincident with the edges of said belt,
belt edge guide means contacting said belt along lines parallel and proximate with or coincident with the edges of said belt to guide the edge areas of said belt along predetermined paths, and
belt contouring means comprising at least two belt shaping devices each in a contoured shape of preselected design contacting the surface of said belt so as to change the cross-sectional profile of said moving belt in a pre-selected distortion-compensating sequence such that the distortions introduced into said belt by variations between the paths of the center of said belt and the edge areas of said belt are compensated for and thus removed, said contoured shape being a curve such that when said belt is passed across said device the surface of the belt is displaced from the place of the edges of said belt in a smooth curve, one of said devices contacting said belt before said belt edge guide means tubularizes said belt and the other device contacting said belt after said belt edge guide means detubularizes said belt.

* * * * *

UNITED STATES PATENT OFFICE
CERTIFICATE OF CORRECTION

Patent No. 3,978,976     Issue Date September 7, 1976

Inventor(s) Ewald Albert Kamp

It is certified that error appears in the above-identified patent and that said Letters Patent are hereby corrected as shown below:

Column 4, Line 24: "inluding" should be --including--

Column 4, Line 37: "as plastic" should be --or plastic--

Column 4, Line 62: "belt could" should be --belt would--

Column 5, Line 18: "such" should be --Such--

Column 7, Line 14: "place" should be --plane--

Column 7, Line 46: "place" should be --plane--

Column 7, Line 65
and
Column 8, Line 1: "(to a desired configuration)" should not be present Column 8, Line 59: "place" should be --plane--

Signed and Sealed this

Twenty-third Day of November 1976

[SEAL]

Attest:

RUTH C. MASON
Attesting Officer

C. MARSHALL DANN
Commissioner of Patents and Trademarks